United States Patent

Chou

Patent Number: 5,431,463
Date of Patent: Jul. 11, 1995

[54] AIR CELL BUMPER DEVICE

[76] Inventor: Tong-Jih Chou, 2F., No. 24, Lane 244, Hsing Lung Road, Sec. 2, Taipei, Taiwan

[21] Appl. No.: 187,993

[22] Filed: Jan. 28, 1994

[51] Int. Cl.⁶ .............................................. B60R 19/20
[52] U.S. Cl. .................................. 293/110; 293/133; 293/137
[58] Field of Search ............... 293/107, 110, 134, 135, 293/137, 133, 142

[56] References Cited

U.S. PATENT DOCUMENTS

| | | | |
|---|---|---|---|
| 1,402,324 | 1/1922 | Van Gelder | 293/107 |
| 3,938,840 | 2/1976 | Haase et al. | 293/110 |
| 4,099,759 | 7/1978 | Kornhauser | 293/110 |

FOREIGN PATENT DOCUMENTS

| | | | |
|---|---|---|---|
| 2207560 | 2/1972 | Germany | |
| 2360525 | 12/1973 | Germany | 293/110 |

Primary Examiner—Dennis H. Pedder
Assistant Examiner—Kia M. Robinson
Attorney, Agent, or Firm—Lowe, Price, LeBlanc & Becker

[57] ABSTRACT

An air cell bumper device includes a mounting base mounted on a mounting track being fixed to the body of a motor vehicle, and a rubber air bag fastened to the mounting base for impact protection, the rubber air bag having an inflatable big air bag and small air-tight air bags separated around the big air bag by partition walls, and whereby when the rubber air bag is compressed by an impact, the partition walls will be torn permitting air to rapidly move from the big air chamber into the small air chamber to buffer the impact.

2 Claims, 5 Drawing Sheets

Fig 7
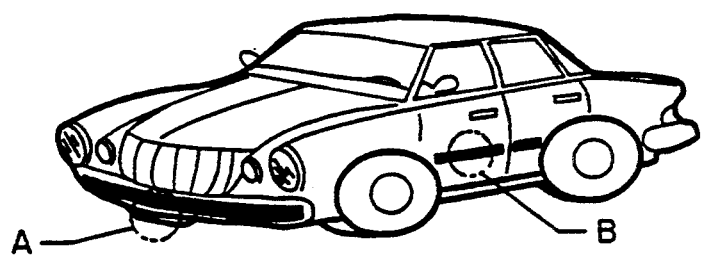
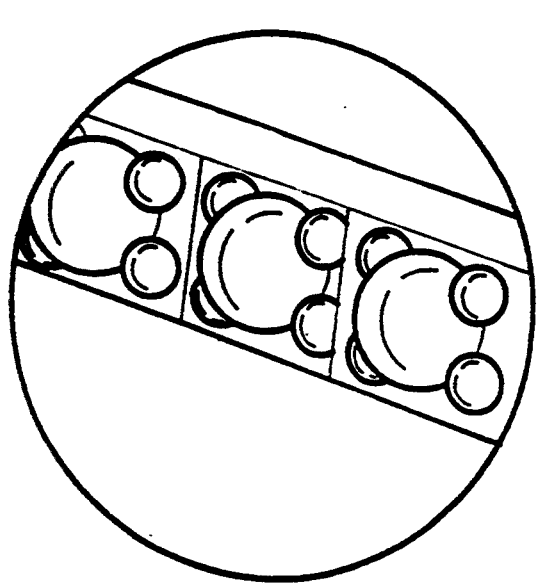
Fig 8A
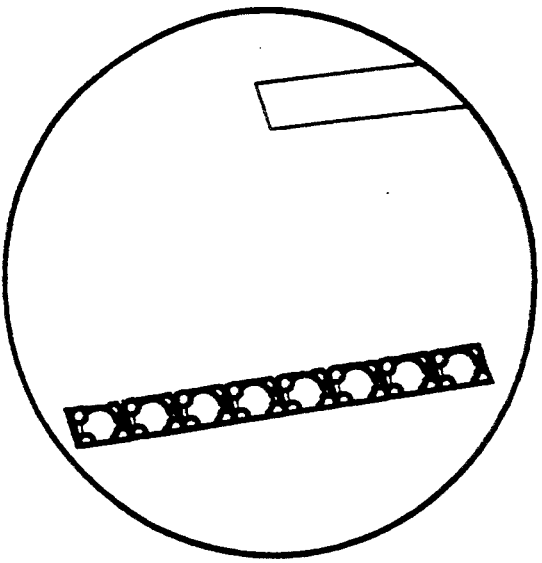
Fig 8B

AIR CELL BUMPER DEVICE

BACKGROUND OF THE INVENTION

The present invention relates to an air cell bumper device for mounting on a motor vehicle to protect against the impact of a collision.

The bumpers of a motor vehicle are respectively disposed at the front and the back to protect against the impact of a collision. These bumpers are commonly made of molded rigid plastics covered with a rubber covering. These bumpers cannot effectively absorb shocks, and therefore they will be damaged easily.

SUMMARY OF THE INVENTION

One object of the present invention is to provide an air cell bumper device for automobiles which produces a satisfactory buffer effect to protect against the impact of a collision. Another object of the present invention is to provide an air cell bumper device which is replaceable.

According one aspect of the present invention, the air cell bumper device is comprised of a mounting base and a rubber air bag fastened to the mounting base. The mounting base has mounting rails for mounting on a mounting track being fixed to the body of a motor vehicle at either side. The rubber air-bag includes a plurality of air chambers of different sizes. When the rubber air bag is compressed by an impact, inside air is forced to distribute in all directions, and therefore the impact is buffered. According to another aspect of the present invention, a shock absorber may be installed inside the rubber air bag to absorb shocks.

BRIEF DESCRIPTION OF THE DRAWINGS

FIG. 7 is an installed view showing air cell bumpers of the present invention connected in series and mounted on the body of an automobile; and FIG. 8a is an enlarged view of the air cells in series on a front bumper of an automobile.

FIG. 8b is an enlarged view of the air cells in series on a door bumper of an automobile.

DETAILED DESCRIPTION OF THE PREFERRED EMBODIMENTS

Figure 1:
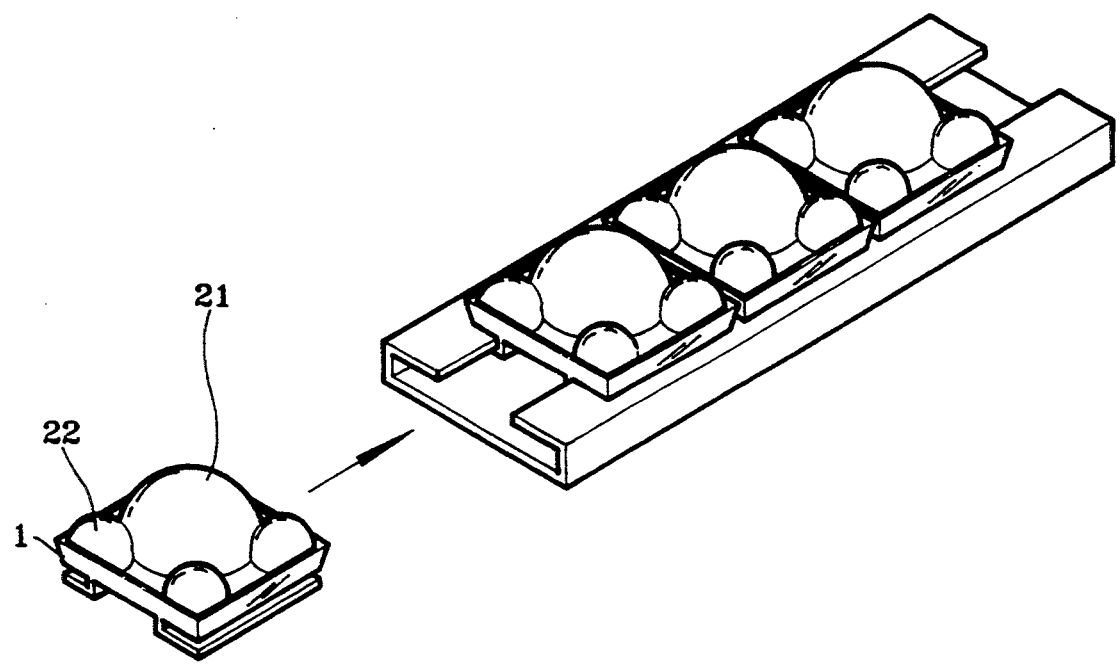
FIG. 1 shows a plurality of air cell bumper devices connected in a series according to the present invention.
Figure 2:
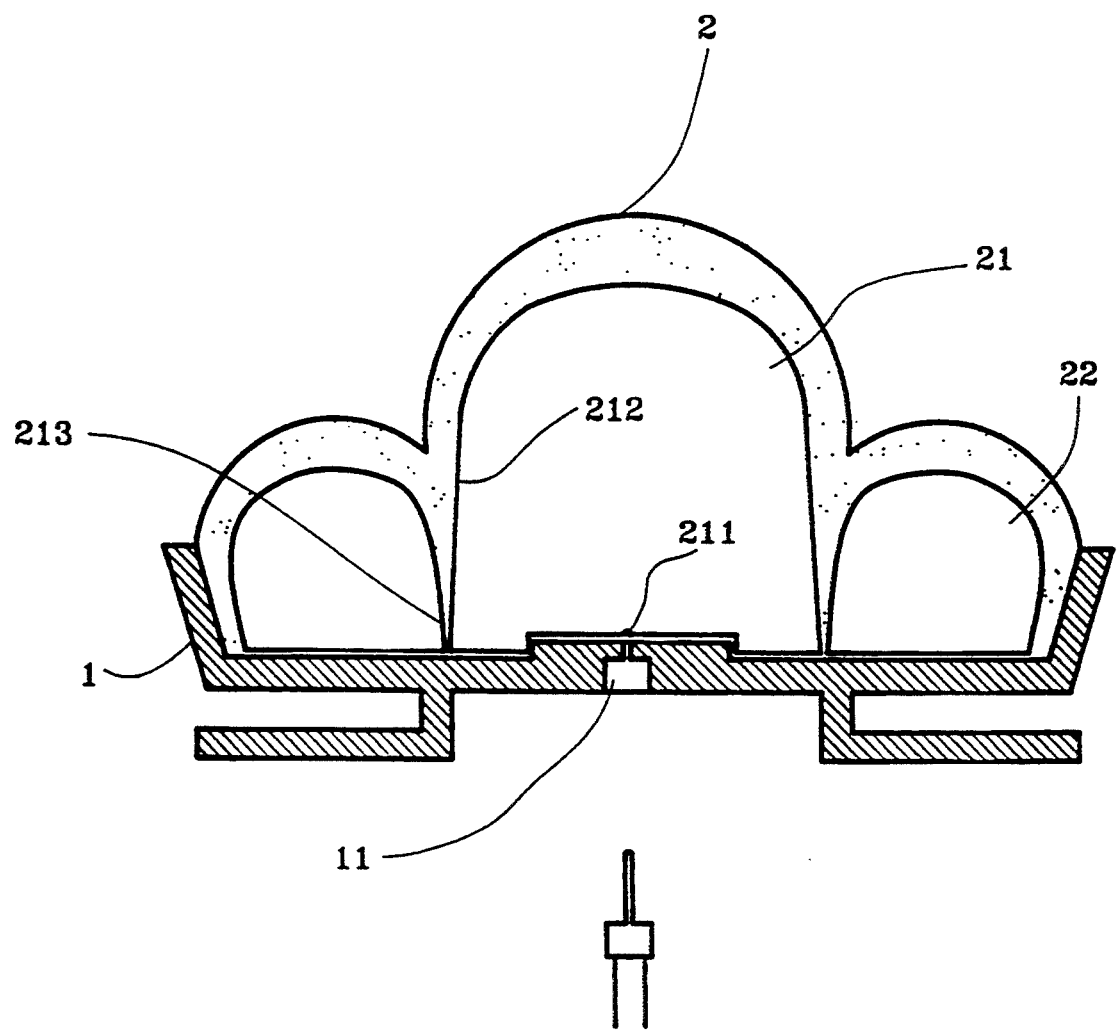
FIG. 2 is a plain view in section of an air cell bumper device according to the present invention.
Figure 3:
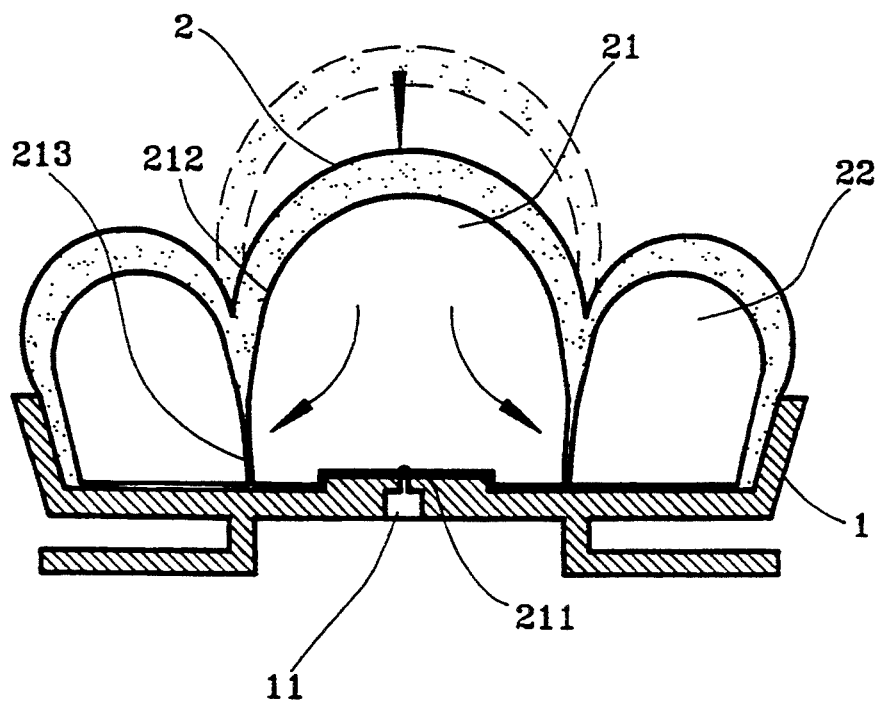
FIG. 3 shows the air cell bumper device compressed (step I)
Figure 4:
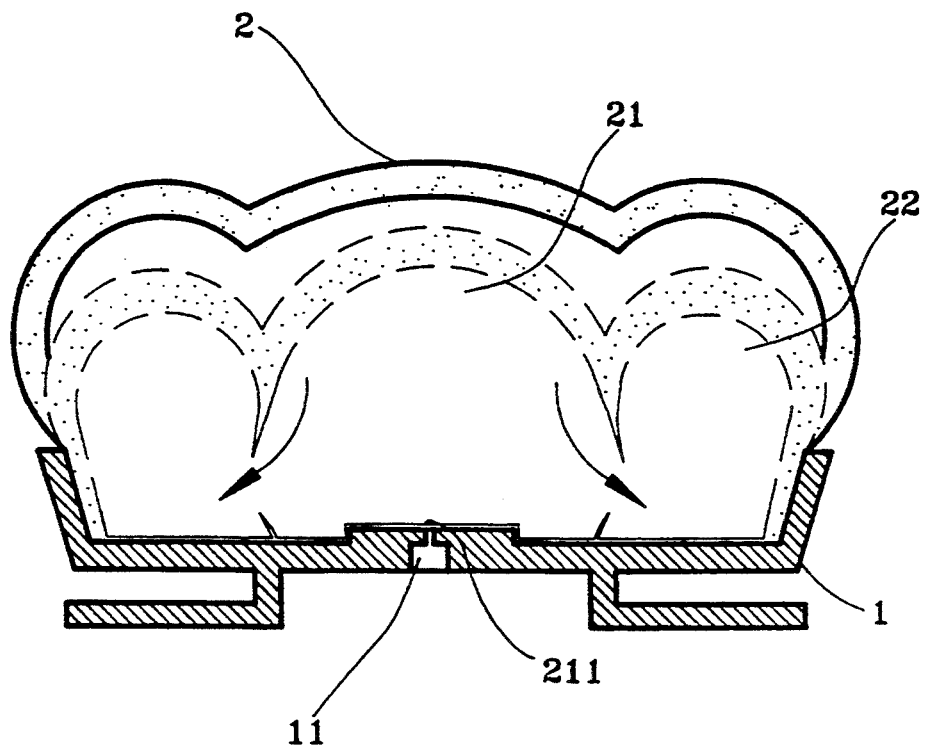
FIG. 4 shows the air cell bumper device compressed (step II)

Referring to FIGS. 1, 2, 3, 4, and 7, an air cell bumper in accordance with one embodiment of the present invention is generally comprised of a mounting base 1, and a rubber air bag 2 mounted on the mounting base 1. The mounting base 1 is made of a rigid, impact resistant material, having mounting rails 12 for mounting on a mounting track being fixed to the body of a motor vehicle. The rubber air bag 2 is fastened to the mounting base 1 by a high-frequency sealing process, comprising a big air chamber 21 in the center, a plurality of small air chambers 22 separated around the big air chamber 21 by partition walls 212. The partition walls 212 are respectively made thinner toward the bottom. The small air chambers 22 are made air tight. The big air chamber 21 has an one-way air valve 211 at the bottom connected to an air hole 11 on the bottom of the mounting base 1 for letting air enter the big air chamber 21. When the rubber air bag 2 is compressed by an impact, the thinnest bottom ends 213 of the partition walls 212 will be torn, permitting air to rapidly move from the big air chamber 21 into the small air chambers 22 (See FIG. 4), and therefore the impact is buffered.

Figure 5:
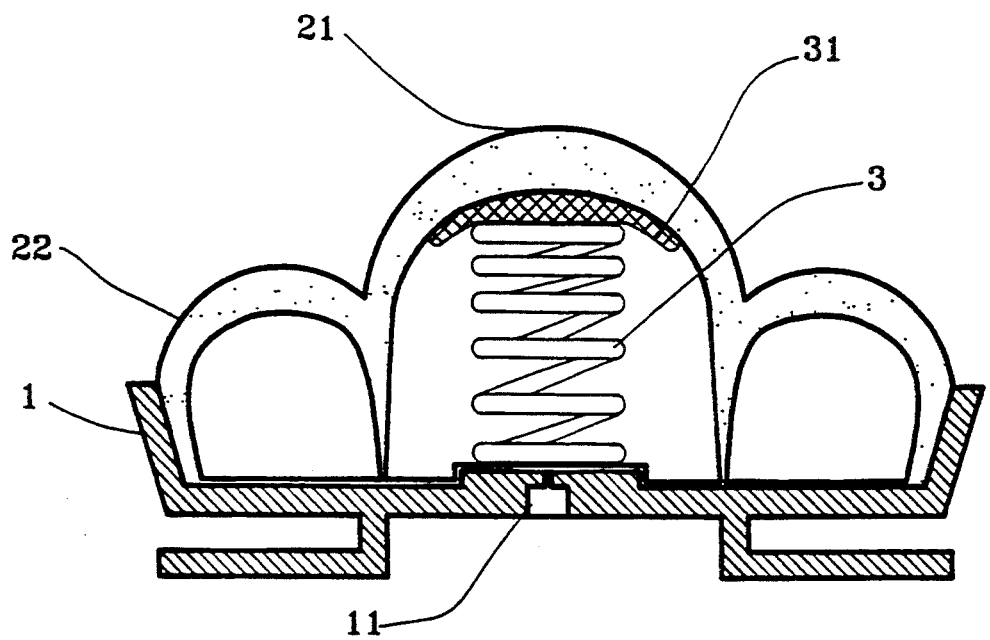
FIG. 5 is a plain view in section of an alternate form of the air cell bumper.
Figure 6:
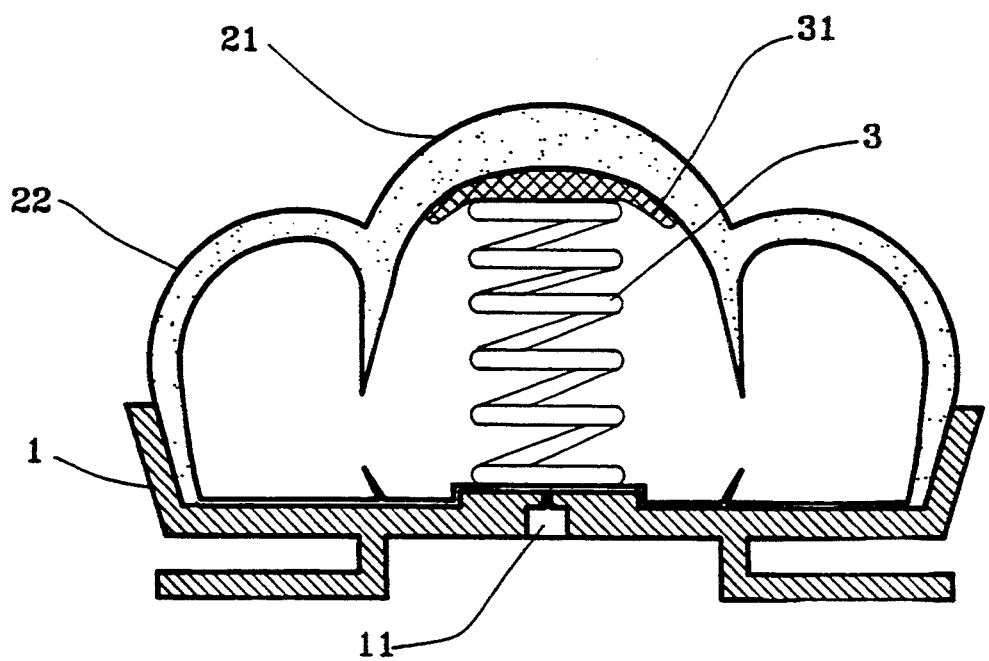
FIG. 6 shows the air cell bumper of FIG. 5 returned to its former shape after an impact.

Referring to FIGS. 5 and 6, a shock absorber, for example: a compression spring 3 may be installed inside the rubber air bag 2 to support the big air chamber 21 in shape. The compression spring 3 has a top end covered with a protective pad 31. The protective pad 31 fits over the inside surface of the top wall of the big air chamber 21, therefore the compression spring 3 does not damage the big air chamber 21 when it is suddenly compressed by an impact. The compression spring 3 effectively absorb shocks upon an impact, and quickly moves the rubber air bag 2 into its former shape after an impact.

While only one embodiment of the present invention has been shown and described, it will be understood that various modifications and changes could be made without departing from the spirit and scope of the invention.

What is claimed is:

1. An air cell bumper device comprising a mounting base made of a rigid, impact resistant material and having a through hole at the bottom and two symmetrical mounting rails for mounting on a mounting track being fixed to the body of a motor vehicle, and a rubber air bag fastened to said mounting base for impact protection, said rubber air bag comprising a big air chamber in the center, a plurality of small air chambers separated around said big air chamber by partition walls, said partition walls being made gradually thinner toward the bottom, said big air chamber having an one-way air valve at the bottom connected to the through holes on said mounting base for letting air enter said big air chamber, and whereby when said rubber air bag is compressed by an impact, the thinnest bottom ends of said partition walls will be torn permitting air to rapidly move from said big air chamber into said small air chamber to buffer the impact.

2. The air cell bumper device of claim 1 further comprising a compression spring supported inside said big air chamber, and a pad retained on said compression spring at the top and fitted over the inside surface of said big air chamber.

* * * * *